(12) United States Patent
Mizutani et al.

(10) Patent No.: US 7,197,850 B2
(45) Date of Patent: Apr. 3, 2007

(54) DOOR WEATHER STRIP

(75) Inventors: Yasushi Mizutani, Aichi (JP); Atsushi Hashimoto, Aichi (JP)

(73) Assignee: Toyoda Gosei Co., Ltd., Aichi (JP)

( * ) Notice: Subject to any disclaimer, the term of this patent is extended or adjusted under 35 U.S.C. 154(b) by 261 days.

(21) Appl. No.: 10/885,889

(22) Filed: Jul. 8, 2004

(65) Prior Publication Data

US 2005/0028448 A1  Feb. 10, 2005

(30) Foreign Application Priority Data

Jul. 11, 2003  (JP) .......................... P2003-273686

(51) Int. Cl.
*E06B 7/22* (2006.01)
*E06B 7/23* (2006.01)
*E06B 7/14* (2006.01)

(52) U.S. Cl. .................. 49/498.1; 49/475.1; 49/489.1; 49/495.1

(58) Field of Classification Search ............... 49/475.1, 49/479.1, 489.1, 489.3, 495.1, 498.1
See application file for complete search history.

(56) References Cited

U.S. PATENT DOCUMENTS 5,105,580 A    4/1992  Akachi et al.
5,538,578 A    7/1996  Sugawara et al.
5,851,048 A *  12/1998 Fujita et al. ........... 296/107.04
6,357,182 B1 * 3/2002  Nozaki ...................... 49/498.1
6,405,489 B1   6/2002  Miura
6,601,346 B2 * 8/2003  Nozaki ...................... 49/498.1

FOREIGN PATENT DOCUMENTS

| EP | 0 736 405 A1 | 10/1996 |
| JP | A-H10-324159 | 12/1998 |
| JP | A-11-005450  | 1/1999  |
| JP | 11005450     | 12/1999 |
| WO | WO 97/28979  | 8/1997  |

* cited by examiner

*Primary Examiner*—Jerry Redman
*Assistant Examiner*—Colleen M. Quinn
(74) *Attorney, Agent, or Firm*—Posz Law Group, PLC

(57) ABSTRACT

A door weather strip has a mounting base portion, a hollow seal portion, a sub-seal lip, and a backside seal lip. Leading lips are provided in the middle of a front pillar part in such a way as to connect the backside seal lip to the sub-seal lip. Each of the leading lips forms an acute angle with respect to an extending direction of the backside seal lip. Especially, in an attached state, an intersection angle α formed between the backside seal slip and each of the leading lips is set to be smaller than an angle β formed between the extending direction of the backside seal lip, and a vertical line.

9 Claims, 4 Drawing Sheets

DOOR WEATHER STRIP

This application is based on Japanese Patent Application No. 2003-273686, which is incorporated herein by reference.

BACKGROUND OF THE INVENTION

1. Field of the Invention

The present invention relates to a door weather strip, which is attached to an outer peripheral portion of a front door of an automobile, for sealing between the front door and a body thereof.

2. Description of the Related Art

Most of the door weather strip is constituted by an extruded part. Corner portions and soon are constituted by molded parts. The door weather strip has a mounting base portion attached to a retainer, which is provided on an outer periphery of the front door, and also has a hollow seal portion integrally formed with the mounting base portion. Further, a sub-seal lip is integrally formed with a part provided at a more exterior side of the automobile than the hollow seal portion. Also, a backside seal lip is formed integrally with a part between the sub-seal lip and the mounting base portion. Furthermore, when the front door is closed, the hollow seal portion and the sub-seal lip deform to thereby seal between the body and the door. Incidentally, the backside seal lip abuts against a door frame (door panel) to thereby seal between the door frame and the mounting base portion. Instead of using the retainer, the door weather strip is attached to the outer periphery of the front door with double-sided adhesive tape provided on the bottom surface of the mounting base portion.

Generally, in the weather strip constituted in this manner, a groove is formed between the backside seal lip and the sub-seal lip. Water flowing down from a roof portion is led through the groove to a front pillar part and a hinge part of the door and finally dropped to the exterior side of the automobile. A related technique of deforming the backside seal lip and the sub-seal lip to thereby form a draining lip in the middle of the front pillar part and close the groove in such a weather strip has been proposed (see, for example, JP-A-11-5450).

However, according to the related technique, there has been a fear of occurrence of the following drawback. That is, in a cold district or the like, there is a case in which snow accumulates on a roof portion of an automobile, and in which the accumulated snow gradually melts and flows in just dribbles along a front pillar part thereof. Incidentally, the draining lip described in JP-A-11-5450 is formed in such a way as to form an obtuse angle with respect to an extending direction of the groove. Thus, a small amount of water (droplet like water) is not immediately drained to the exterior side of the automobile but accumulated on the draining lip. Further, when water, whose amount is equal to or more than a predetermined value, is accumulated, the water is drained to the exterior side of the automobile. However, at that time, the amount of the accumulated water is relatively large. Thus, there is a fear that the momentum of the water may make the water go over the draining lip and flow downstream.

Furthermore, when the door is closed, the sub-seal lip has a relatively large bend, so that the draining lip also bends. Thus, in the case of simply forming the draining lip, there is a fear of forming a space from which water flows down to the downstream side groove due to the bending of the draining lip. In this case, the water flows from the space to the downstream side little by little.

Additionally, when water flows downstream little by little in the cold district or the like, the water accumulates along the bottom edge and the hinge part of the door. Thus, there is a fear of occurrence of refreezing of the water. Consequently, there is a fear that problems may occur when the door is opened and closed.

SUMMARY OF THE INVENTION

An object of the invention is to provide a door weather strip enabled to solve the problems due to water refreezing caused by falling water in driblets in a cold district or the like.

Hereinafter, means suitable for solving the problems and achieving the object are described by itemization thereof. Incidentally, descriptions of operations and advantages corresponding and peculiar to such means are appended to the description of configuration thereof as needed.

According to the invention, there is provided a door weather strip (hereunder referred to as a first aspect of the invention) having a mounting base portion, a hollow seal portion integrally formed with the mount base portion, a sub-seal lip provided on an exterior side of the automobile with respect to the hollow seal portion, and a backside seal lip projecting between the sub-seal lip and the mounting base portion so that a tip end of the backside seal lip abuts with a door panel of the front door. The door weather strip seals between the front door and an automobile body by deforming the hollow seal portion and the sub-seal lip when the front door is closed. The door weather strip also configured so that at least one leading member, which is continuous at least from the backside seal lip, is provided in a groove formed between the sub-seal lip and the backside seal lip for leading water in the groove to an outside of the automobile by closing off the groove in a section corresponding to a front pillar part of the front door, and the leading member intersects with an extending direction of the backside lip so as to form an acute angle therebetween, and the extending direction is a direction in which water flows down.

According to the first aspect of the invention, when the front door is closed, the hollow seal portion and the sub-seal lip are deformed to thereby seal between the body and the front door of the automobile. Further, an end of the backside seal lip provided between the sub-seal lip and the mounting base portion abuts against the door panel of the front door. Thus, water or the like is restrained from entering a retainer side. Meanwhile, according to the first aspect of the invention, the groove formed between the backside seal lip and the sub-seal lip is closed by the leading member connected to at least the backside seal lip. Water flowing down from the upstream side of the groove is led to the exterior side of the automobile. Further, the leading member is configured in such a manner as to form an acute angle with respect to the extending direction of the backside seal lip. Thus, a large amount of water flowing down the groove like dribbles does not accumulate on the leading member. Even just a small amount of the water is apt to be more positively led to the exterior side of the automobile. Thus, although there is a case in which snow accumulates on the roof portion of the automobile, for example, in the cold district, and in which the accumulated snow gradually melts and flows in just dribbles along the front pillar part thereof, according to the first aspect of the invention, water flowing in just dribbles is more surely led to the exterior side of the automobile. The flow-down of such water to the groove provided at the downstream side from the leading member hardly occurs. Therefore, the first aspect of the invention can solve problems, such as occurrence of refreezing of such water at the hinge part or the bottom edge part of the front door.

In an embodiment (hereunder referred to as a second aspect of the invention) of the first aspect of the invention, an intersection angle between the backside seal lip and the leading member is formed smaller than an angle formed between the extending direction of the backside seal lip and a vertical axis of the automobile.

According to the second aspect of the invention, in the state in which the door weather strip is attached to the front door, the intersection angle formed between the backside seal lip and the leading member is smaller than the angle formed between the extending direction of the backside seal lip, and the vertical line. That is, although the angle formed between the extending direction of the backside seal lip, and the vertical line is originally an acute angle, the intersection angle formed between the backside seal lip and the leading member is more acute. Thus, the aforementioned operation and advantages, which reside in that water flowing in just dribbles is more surely led to the exterior side of the automobile and that the flow-down of such water to the groove provided at the downstream side from the leading member hardly occurs, are more surely achieved.

In an embodiment (hereunder referred to as a third aspect of the invention) of the first or second aspect of the invention, an intersection angle between the backside seal lip and the leading member when the front door is closed is formed smaller than the intersection angle therebetween when the front door is open.

When the front door is closed, the sub-seal lip and so forth are bend-deformed. Thus, it is expected that the leading member follows such bent-deformation of the sub-seal lip and is also bend-deformed. Regarding this, according to the third aspect, the intersection angle formed between the backside seal slip and each of the leading member at the time of closing the front door is set to be smaller than the intersection angle therebetween at the time of opening the front door. Thus, even when the leading member causes bent-deformation, the intersection angle formed between the backside seal lip and the leading member becomes smaller. Therefore, the configuration of the third aspect more reliably prevents such water from being accumulated therein. Also, the third aspect can restrain the bent-deformation of the sub-seal lip and so on from adversely affecting the performance of leading such water to the exterior side of the automobile.

In an embodiment (hereunder referred to as a fourth aspect of the invention) of one of the first to third aspect of the invention, the leading member is formed continuously to the backside seal lip and the sub-seal lip, and is provided with a bent portion therein, and the bent portion is deformed when the front door is closed, so that an intersection angle between the backside seal lip and the leading member when the front door is closed is formed smaller than the intersection angle therebetween when the front door is open.

According to the fourth aspect of the invention, the leading member is formed in such a way as to be connected to at least the backside seal lip and the sub-seal lip. Also, the bending portion is provided in the middle portion of the leading member. Further, when the front door is closed, the leading member is bend-deformed at the bending portion. Thus, the intersection angle formed between the backside seal lip and the leading member becomes smaller than that formed therebetween when the front door is opened. Thus, according to the fourth aspect, the leading member is provided with the bending portion. Consequently, the leading member is more positively bend-deformed, so that the intersection angle is reduced. Therefore, water becomes more difficult to be accumulated. Moreover, water is more positively led to the exterior side of the automobile.

In an embodiment (hereunder referred to as a fifth aspect of the invention) of one of the first to fourth aspect of the invention, a part of the leading member protrudes outwardly from a segment defined between an apex of the door panel and an apex of the sub-seal lip, at least when the front door is closed.

According to the fifth aspect of the invention, at least when the front door is closed, a part of the leading member protrudes outwardly from the line segment connecting the aped of the door panel and the aped of the sub-seal lip. This facilitates the leading of water, which flows through the groove, to the exterior side of the automobile.

In an embodiment (hereunder referred to as a sixth aspect of the invention) of one of the first to fifth aspect of the invention, the backside seal lip and the sub-seal lip is formed in a molded part and in a vicinity of the leading member.

The first to fifth aspect of the invention aim at positively leading a very small amount of water to the exterior side of the automobile. There are stringent demands on the precision relating to the installation position and angle of the leading member and so forth of each product. Regarding this, according to the sixth aspect, at least the leading member, and the backside seal lip and the sub-seal lip, which are provided in the vicinity of the leading member are constituted by molded parts. Thus, as compared with the case of separately attaching the leading member to the weather strip, the precision relating to the leading member and so forth can dramatically be enhanced. Consequently, variation in the performance of leading the water to the exterior side among products can be eliminated. Moreover, production efficiency can be enhanced. Further, especially, in the case of constituting the leading member by plural lips, similarly as a seventh aspect (to be described below) of the invention, the invention has significant merit in production efficiency.

In an embodiment (hereunder referred to as a seventh aspect of the invention) of one of the first to sixth aspect of the invention, the leading member is provided with at least one lip.

Generally, in the case where a component, whose cross-section has a shape differing partly from those of the cross-sections of other components of a part, is provided in the middle of the part, there is a fear that the sealability (associated with, for instance, the reaction forces of the sub-seal lip and so on) of this part differs from those of other parts, and that this difference affects the sealing performance of the door weather strip. Regarding this, because the seventh aspect, the leading member is constituted by one or more lips according to the seventh aspect, the degree of difference in sealability among the part, at which the leading member is installed, and other parts can be minimized, in comparison with the case of constituting the leading member by a block-like member. Consequently, the seventh aspect can prevent occurrence of a situation in which such difference adversely affects the sealing performance of the door weather strip. Incidentally, either a single lip or plural lips may be employed for constituting the leading member. In the case of constituting the leading member by plural lips, multilevel effects of leading water to the exterior side can be expected. Thus, the problems can be more surely solved.

BRIEF DESCRIPTION OF DRAWINGS

FIG. 2 is a perspective view illustrating the configuration of an automobile or the like;

DETAILED DESCRIPTION OF PREFERRED EMBODIMENTS

Hereinafter, an embodiment of the invention is described by referring to the accompanying drawings.

Figure 2:
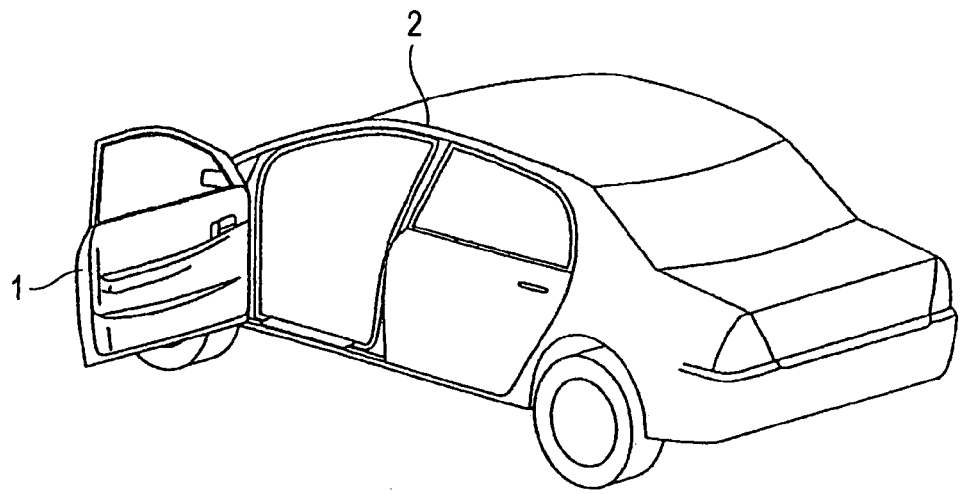
Figure 3:
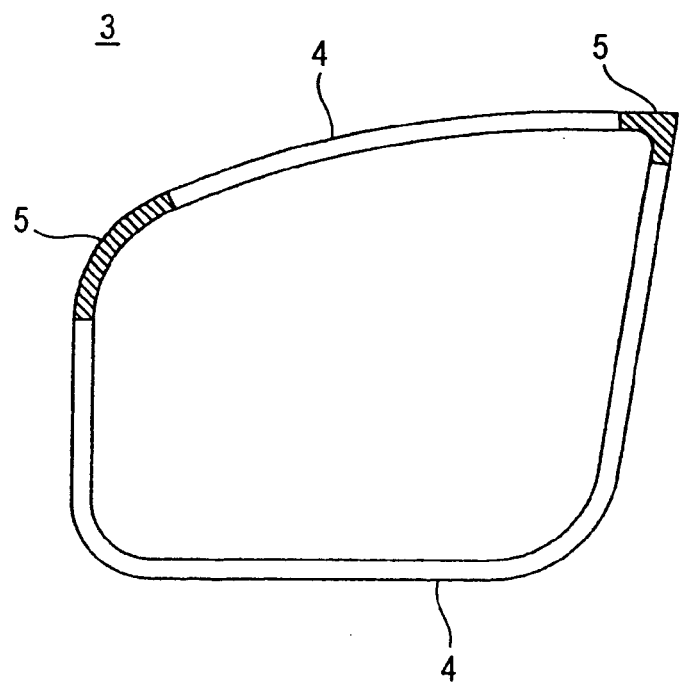
FIG. 3 is a front view schematically illustrating the door weather strip.

As shown in FIGS. 2 and 3, a front door 1 is openably and closeably provided in an automobile. A door weather strip 3 is attached along the outer periphery of such a front door 1. Most of the parts extending along the longitudinal direction of the weather strip 3 are constituted by extruded parts 4. Also, corner portions or the like are molded parts 5, respectively. In this embodiment, both the extruded part 4 and the molded parts 5 are formed of an ethylene-α-olefin-non-conjugated diene copolymer (EPDM) sponge rubber.

This embodiment features a part of such a door weather strip 3, which corresponds to a front pillar. Therefore, the configuration of the part corresponding to the front pillar is described hereinbelow.

Figure 4:
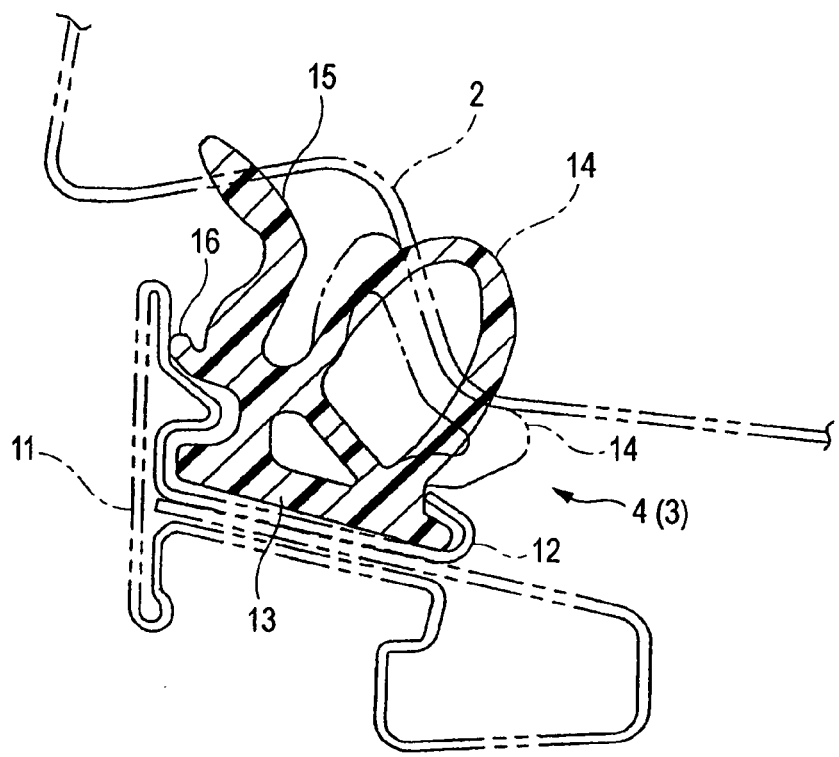
FIG. 4 is a cross-sectional view illustrating a general portion of the door weather strip.

As shown in FIG. 4, in the part corresponding to the front pillar, each of the extruded parts 4 mainly constituting the door weather strip 3 has a mounting base portion 13 attached to a retainer 12 of a door frame 11 serving as a door panel, and also has a hollow seal portion 14 integrally formed with the mounting base portion 13. Moreover, a sub-seal lip 15 is provided at a more exterior side than the hollow seal portion 14 in the automobile. In an attached state of the door weather strip 3, a tip end of the backside seal lip 16 abuts against the door frame 11. Such abutment of the tip end seals between the door frame 11 and the door weather strip 3 (that is, the mounting base portion 13).

Further, in the door weather strip 3 having the aforementioned configuration, the hollow seal portion 14 and the sub-seal lip 15 pressure contact with an automobile body 2 and deform to thereby seal between the automobile body 2 and the front door 1.

Figure 1:
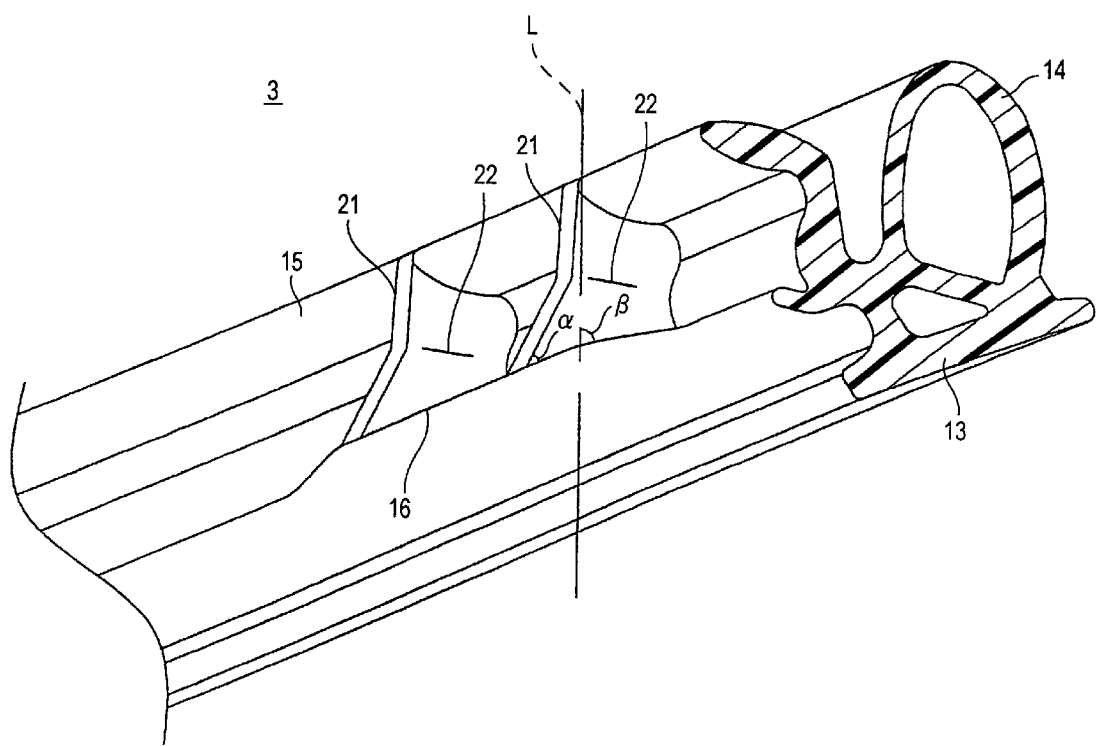
FIG. 1 is a partially perspective view illustrating a primary part of a door weather strip according to an embodiment of the invention.
Figure 5:
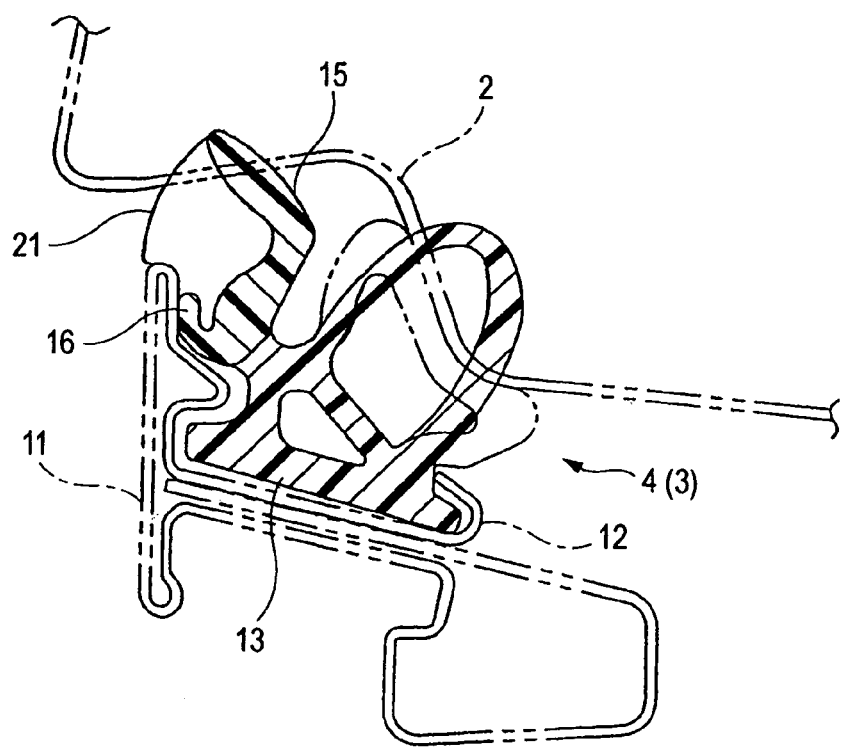
FIG. 5 is a cross-sectional view illustrating a primary portion (in the vicinity of a leading lip) of the door weather strip.

Meanwhile, in this embodiment, as shown in FIGS. 1 and 5, leading lips 21 serving as leading members are provided so as to join the backside seal lip 16 and the sub-seal lip 15 in the middle of the front pillar part (slightly above a part to which a door mirror is attached). In this embodiment, two leading lips 21 are arranged in a front-rear direction. A groove formed between the backside seal lip 16 and the sub-seal lip 15 is closed by the presence of such leading lips 21.

More particularly, each of the leading lips 21 is configured in such a way as to form an acute angle with respect to an extending direction of the backside seal lip 16. The extending direction is particularly a direction in which water flows down. Especially, in an attached state, an intersection angle α formed between the backside seal slip 16 and each of the leading lips 21 is set to be smaller than an angle β formed between the extending direction of the backside seal lip 16, and a vertical line.

Also, in this embodiment, a bending portion 22 is provided in the middle of each of the leading lips 21. Each of the leading lips 21 is substantially dogleg shaped in front view thereof. Further, when the front door 1 is closed, the distance between the backside seal lip 16 and the sub-seal lip 15 decreases. Also, each of the leading lips 21 is bend-deformed at the bending portion 22. As a result of such bent-deformation, the intersection angle between the backside seal lip 16 and the leading lip 21 becomes smaller than that obtained when the front door 1 is opened.

Additionally, at least when the front door 1 is closed, a part of each of the leading lips 21 protrudes somewhat outwardly from a line segment connecting the aped portions of the sub-seal lip 15 and the door frame 11.

Incidentally, in this embodiment, the leading lips 21, and the backside seal lip 16 and the sub-seal lip 15, which are provided in the vicinity of each of the leading lips 21, are formed by molding. More particularly, an extruded part 4 is once preliminarily formed by extrusion-forming. Then, parts, at which the leading lips 21 are provided, are cut off therefrom. Thereafter, the leading member including the leading lips 21 are formed by injection-molding a leading lip precursor into the cut off parts of the extruded part 4.

Next, operations and effects of this embodiment configured as described above are described hereinbelow.

In this embodiment, the groove formed between the backside seal lip 16 and the sub-seal lip 15 is closed by the presence of the leading lip 21. Water flowing down from the upstream side of the groove is led to the exterior side of the automobile. Further, each of the leading lips 21 is configured in such a manner as to form an acute angle with respect to the extending direction of the backside seal lip 16. Especially, in a state in which the door weather strip 3 is attached to the front door 1, the intersection angle α formed between the backside seal lip 16 and each of the leading lips 21 is set to be smaller than the angle β formed between the extending direction of the backside seal lip 16, and a vertical line. Thus, a large amount of water flowing down the groove like dribbles does not accumulate on the leading lips 21. Even just a small amount of the water is apt to be more positively led to the exterior side of the automobile. Thus, although there is a case in which snow accumulates on the roof portion of the automobile in the cold district or the like, and in which the accumulated snow gradually melts and flows in just dribbles along the front pillar part thereof, according to this embodiment, water flowing in just dribbles is more surely led to the exterior side of the automobile. The flow-down of such water to the groove provided at the downstream side from the leading lips 21 hardly occurs. Therefore, the invention can solve problems, such as occurrence of refreezing of such water at the hinge part or the bottom edge part of the front door 1.

Figure 6A:
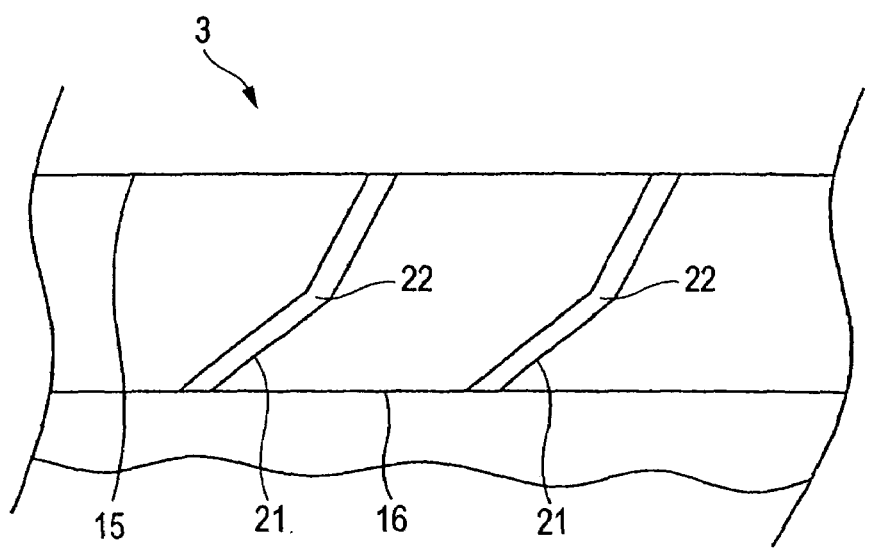
FIG. 6A is a schematic view illustrating the shape of the leading lip of the door weather strip when a front door is opened.
Figure 6B:
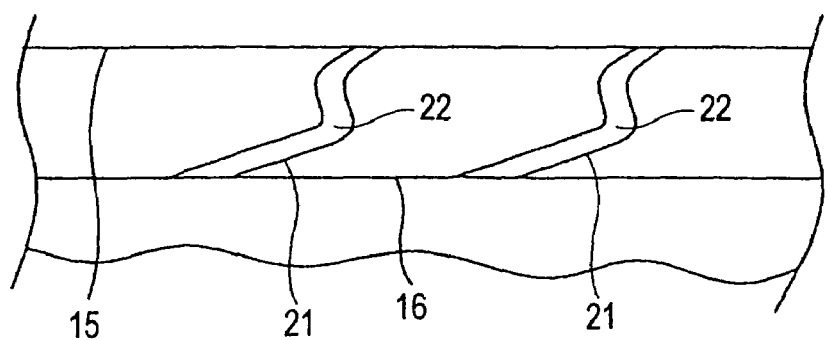
FIG. 6B is a schematic view illustrating the shape of the leading lip of the door weather strip when the front door is closed.

Further, in this embodiment when the front door 1 is closed, the sub-seal lip 15 and so on bend from a state illustrated in FIG. 6A, so that the distance between the sub-seal lip 15 and the backside seal lip 16 decreases. Following such bend, the leading lips 21 are also bend-deformed. Regarding this, because of the fact that the intersection angle α formed between the backside seal slip 16 and each of the leading lips 21 is set to be smaller than the angle β formed between the extending direction of the backside seal lip 16, and a vertical line, and that the bending portion 22 is provided in each of the leading lips 21, the intersection angle formed between the backside seal lip 16 and each of the leading lips 21 becomes smaller (more acute) as shown in FIG. 6B. Thus, the configuration of this embodiment of the invention more reliably prevents such water from being accumulated therein. Also, this embodiment of the invention can restrain the bent-deformation of the sub-seal lip 16 and so on from adversely affecting the performance of leading such water to the exterior side of the automobile. Rather than degrading the performance of leading such water to the exterior side, this embodiment of the invention can further enhance such performance. Incidentally, in each of FIGS. 6A and 6B drawn on paper, the right-side part thereof corresponds to an upstream side.

Also, when the front door 1 is closed, a part of each of the leading lips 21 protrudes somewhat outwardly from a line segment connecting the aped portions of the sub-seal lip 15 and the door frame 11. Thus, at a stage before the water goes over the leading lips 21, the water is more surely led to the exterior side of the automobile. That is, this embodiment of the invention facilitates an operation of positively leading the water to the exterior side of the automobile. The aforementioned operation and advantages are more reliably achieved.

Additionally, the leading lips 21 and so on are constituted by the molded parts. Thus, as compared with the case of separately attaching the leading lips to the weather strip, the precision relating to the position, the angle and so forth thereof can dramatically be enhanced. Consequently, variation in the performance of leading the water to the exterior side among products can be eliminated. Moreover, production efficiency can be enhanced.

Incidentally, the invention is not limited to the described in the description of the aforementioned embodiment and may be carried out as follows.

(a) Although the bending portion 22 is provided in each of the leading lips 21 in the aforementioned embodiment, the weather strip according to the invention may employ a configuration in which no bending portions 22 are provided in the leading lips 21.

(b) Although two leading lips 21 are provided in this embodiment, only one leading lip 21 may be provided therein. Alternatively, three or more leading lips 21 may be provided therein.

(c) Although the thin leading lips 21 are employed as leading members in the aforementioned embodiment, block-like leading members may be provided therein. Incidentally, in consideration of a partial reaction force of the sub-seal lip (or from the viewpoint of a more uniform reaction force), lip-like leading members are preferable.

(d) Although the aforementioned embodiment employs the configuration in which each of the leading lips 21 has an end side connected to the sub-seal lip 15 and also has the other end side connected to the backside seal lip 16, it is sufficient that each of the leading lips 21 is connected to at least the backside seal lip 16. For example, a cutout may be provided at an end side of the sub-seal-lip 15.

What is claimed is:

1. A door weather strip mountable on an outer periphery of a front door of an automobile, comprising:
   a mounting base portion having a substantially flat bottom configured to be retained by a retainer of a door panel;
   a hollow seal portion integrally formed with the mounting base portion;
   a sub-seal lip provided on a portion of an exterior side of the hollow seal portion, where the exterior side is to face an exterior of the automobile when the mounting base portion is mounted on the outer periphery of the front door of the automobile; and
   a backside seal lip projecting between the sub-seal lip and the mounting base portion so that a tip end of the backside seal lip abuts with a door panel of the front door, a groove being defined among the sub-seal lip, the backside seal lip, and a part of the door panel;
   wherein the door weather strip seals between the front door and an automobile body by deforming the hollow seal portion and the sub-seal lip when the front door is closed;
   at least one leading member disposed in the groove to lead water in the groove to the exterior of the automobile, the at least one leading member extending transversely across the groove from the backside seal lip to the sub-seal lip to close off a section of the groove, the at least one leading member being, continuous at least from the backside seal lip, the at least one leading member being formed in an area corresponding to a front pillar of the front door;
   the leading member intersects with an extending direction of the backside seal lip so as to form an acute angle therebetween; and
   the extending direction is a direction in which water flows down.

2. The door weather strip according to claim 1, wherein an intersection angle between the backside seal lip and the leading member is formed smaller than an angle formed between the extending direction of the backside seal lip and a vertical axis of the automobile.

3. The door weather strip according to claim 1, wherein an intersection angle between the backside seal lip and the leading member when the front door is closed is formed smaller than the intersection angle therebetween when the front door is open.

4. The door weather strip according to claim 1, wherein:
   the leading member is formed continuously to the backside seal lip and the sub-seal lip, and is provided with a bent portion therein, wherein an axis along the bent portion is substantially perpendicular to a linear axis along the groove; and
   the bent portion is deformed when the front door is closed, so that an intersection angle between the backside seal lip and the leading member when the front door is closed is formed smaller than the intersection angle therebetween when the front door is open.

5. The door weather strip according to claim 1, wherein a part of the leading member protrudes outwardly from a segment defined between an apex of the door panel and an apex of the sub-seal lip, at least when the front door is closed.

6. The door weather strip according to claim 1, wherein the backside seal lip and the sub-seal lip is formed in a molded part and in a vicinity of the leading member.

7. The door weather strip according to claim 1, wherein there are provided a plurality of leading members, including the at least one leading member.

8. The door weather strip according to claim 1, wherein the at least one leading member has one end side connected to the backside seal lip.

9. The door weather strip according to claim 8, wherein the at least one leading member has an other end side, opposite to the one end side, connected to the sub-seal lip.

* * * * *